(12) United States Patent
Sezai

(10) Patent No.: US 6,392,594 B1
(45) Date of Patent: May 21, 2002

(54) RADIO WAVE RECEIVING APPARATUS HAVING AN IMPROVED ANTENNA RESOLUTION

(75) Inventor: Toshihiro Sezai, Abiko (JP)

(73) Assignee: National Space Development Agency of Japan, Tokyo (JP)

( * ) Notice: Subject to any disclaimer, the term of this patent is extended or adjusted under 35 U.S.C. 154(b) by 0 days.

(21) Appl. No.: 09/399,740

(22) Filed: Sep. 20, 1999

(30) Foreign Application Priority Data

Sep. 22, 1998 (JP) .......................................... 10-284772

(51) Int. Cl.$^7$ ................................................ H01Q 3/00
(52) U.S. Cl. ...................................... 342/360; 343/703
(58) Field of Search ........................... 342/360; 343/703

(56) References Cited

U.S. PATENT DOCUMENTS 4,661,820 A * 4/1987 Pouit et al. .................. 342/360
5,734,347 A * 3/1998 McEligot ..................... 342/159

* cited by examiner

*Primary Examiner*—Theodore M. Blum
(74) *Attorney, Agent, or Firm*—Armstrong, Westerman & Hattori, LLP

(57) ABSTRACT

Provided herein is a radio wave receiving apparatus including a signal processing circuit comprising: a means for the Fourier transform in respect of azimuth of an electric field signal outputted from an antenna receiving circuit; a means for the Fourier transform in respect of azimuth of the antenna pattern of an antenna; a means for dividing the Fourier transform signal derived from the electric field signal by the antenna pattern Fourier transform signal; a low-pass filter for subjecting the divided signal to low-pass filtering; a means for extracting exponential function components of the output signal of the low-pass filter; a means for extending the band of the output signal of the low-pass filter beyond the cut-off frequency of the low-pass filter by using the exponential function components; and a means for subjecting the band-extended signal to Fourier inverse transform in respect of azimuth, the signal after the Fourier inverse transform being outputted as a final antenna output. The antenna resolution thereof is improved by thus using a transfer function in the azimuthal frequency domain resulting from the Fourier transform in respect of azimuth of the antenna pattern.

4 Claims, 4 Drawing Sheets

RADIO WAVE RECEIVING APPARATUS HAVING AN IMPROVED ANTENNA RESOLUTION

BACKGROUND OF THE INVENTION

The present invention relates to radio wave receiving apparatus of which antenna resolution is improved by using a transfer function in azimuthal frequency domain of an antenna pattern.

When observing target objects for example in using a radar, a method has been generally used in which the pointing direction of an antenna beam is changed for example by rotating the antenna to receive radio waves from the respective azimuths pointed to by the antenna beam, so as to observe the intensity of the received radio wave (antenna response) with respect to the azimuths. In doing so, the use of an antenna with a narrower beamwidth results in an antenna response approximating the distribution of the radio wave sources and hence improves the azimuth resolution of the radar. To improve antenna resolution in the conventional art thus means to obtain an antenna response more closely approximating the distribution of the radio wave sources. Although another method is also known such as in a synthetic aperture radar where antenna resolution is improved by subjecting the received radio wave to a signal processing, this method, too, intends to obtain an antenna response approximating the distribution of the radio wave sources by achieving through the signal processing an equivalent effect as that of reducing the antenna beamwidth.

The above conventional technique for improving the antenna resolution is a method of indirectly obtaining the distribution of the radio wave sources from the antenna response and is with a problem that the distribution of the radio wave sources cannot be directly obtained. If there existed an antenna having its pattern represented by the Dirac delta function, the antenna response at such antenna would correspond to the response of the radio wave sources. It is known from the antenna theory, however, that an antenna having such pattern does not exist. Accordingly, since an actual antenna pattern has a finite beamwidth and sidelobes, there is a problem that the distribution of the observable radio wave sources is distorted by the antenna pattern.

SUMMARY OF THE INVENTION

To eliminate the above problems in the conventional case of obtaining the radio wave distribution from an antenna response, it is an object of the present invention to provide a radio wave receiving apparatus capable of directly obtaining the radio wave source distribution.

To solve the above problems, a radio wave receiving apparatus including an antenna for receiving radio waves and a means for moving the pointing direction of an antenna beam of the antenna toward directions for improving resolution is provided in accordance with the present invention, comprising: a means for a Fourier transform in respect of azimuth of a received electric field signal obtained from the antenna while moving the antenna beam; a means for a Fourier transform in respect of azimuth of a received electric field pattern in the presence of one point source of wave of the antenna; a means for dividing a signal resulting from the Fourier transform in respect of azimuth of the antenna-received electric field signal by a signal resulting from the Fourier transform in respect of azimuth of the received electric field pattern in the presence of one point source of wave of the antenna; a low-pass filter for subjecting the signal divided at the division means to low-pass filtering in respect of azimuthal frequency; a means for extracting exponential function components of the output signal of the low-pass filter; a band extension means for extending the output signal of the low-pass filter into an azimuthal frequency region beyond the cut-off frequency of the low-pass filter by using the extracted exponential function components; and a means for subjecting the signal extended by the band extension means to a Fourier inverse transform in respect of azimuth, the signal after the Fourier inverse transform being outputted as a final antenna output.

Supposing in a radio wave receiving apparatus where the pointing direction of antenna beam is moved, $\theta$ is azimuth, $g(\theta)$ is an antenna pattern and $f(\theta)$ is a wave source distribution function, an antenna-received electric field $e(\theta)$ is given by the form of a convolutional integral as in the equation (1).

$$e(\theta) = \int f(\phi) \cdot g(\theta - \phi) d\phi \qquad (1)$$

It should be noted that $f(\phi)$ in the equation (1) is identical as the wave source distribution function $f(\theta)$ and $\phi$, representing an integral variable (an expedient variable in the integral equation), is of the same unit of azimuth as $\theta$.

In general, the antenna pattern $g(\theta)$ is measured as an electric field received at the antenna in the presence of one point source of wave. Here supposing $E(\omega)$, $F(\omega)$, $G(\omega)$ as the functions resulting from Fourier transform in respect of azimuth, respectively, of $e(\theta)$, $f(\theta)$, $g(\theta)$, i.e., as azimuthal frequency functions, the equation (1) may be represented by the form of a multiplication as in the following equation (2)

$$E(\omega) = F(\omega) \cdot G(\omega) \qquad (2)$$

where $G(\omega)$ is an azimuthal frequency function of antenna pattern, i.e., a transfer function in respect of azimuthal frequency of the antenna. Since the antenna pattern $g(\theta)$ is determined when the antenna to be used is decided, $G(\omega)$ can be obtained by calculation from $g(\theta)$. Further, $E(\omega)$ is an azimuthal frequency function of the antenna-received electric field $e(\theta)$ and can be obtained by calculation from a measured value of the electric field signal $e(\theta)$ received by the antenna at each pointing angle. Accordingly, $E(\omega)$, $G(\omega)$ are known and the azimuthal frequency distribution function $F(\omega)$ of wave source can be obtained by $$F(\omega) = E(\omega) / G(\omega) \qquad (3)$$

As described above, $F(\omega)$ is the Fourier transform in respect of azimuth of the distribution function $f(\theta)$ of wave source. It is therefore possible to obtain the wave source distribution function $f(\theta)$ by a Fourier inverse transform in respect of azimuth of $F(\omega)$ which is represented by the equation (3).

In the present invention, $F(\omega)$ represented by the equation (3) is not directly subjected to Fourier inverse transform. Instead, it is processed of Fourier inverse transform after the following treatment. In particular, $F(\omega)$ represented by the equation (3) is subjected to low-pass filtering through a low-pass filter in respect of azimuthal frequency and exponential function components are then extracted from the output signal of the low-pass filter. The output signal of the low-pass filter is then expanded into an azimuthal frequency region beyond the cut-off frequency of the low-pass filter on the basis of the extracted exponential function components so as to extend the band thereof. It then becomes possible to obtain a wave source distribution function $f(\theta)$ more closely approximating the wave source distribution by subjecting thus band-extended F(ω) to Fourier inverse transform in respect of azimuth.

Accordingly, with the radio wave receiving apparatus having the above construction according to the present invention to which the above technique is applied, an equivalent resolution can be obtained as that of an antenna possessing its antenna pattern represented by the Dirac delta function and, since the band thereof is extended on the basis of exponential function components, the resolution can be furthermore improved based on the inversely proportional relationship between frequency band and resolution.

The extension of band on the basis of exponential function components will now be described. It is supposed in the present invention that F(ω) can be expressed by the sum of "m" exponential functions which is represented by the following equation (4).

$$F(\omega)=\Sigma \alpha_i \exp(\beta_i \cdot \omega) \quad (4)$$

where the summation range of summation symbol "Σ" is i=1 to i=m and the coefficients $\alpha_i$, $\beta_i$ are determined by the acquired data. Thereafter, the domain of data is expanded on the assumption that such relational expression holds also in regions outside the acquired range of the spatial frequencies ω. Such technique for expanding domain is a type of extrapolation method. However, while the commonly used extrapolation is a general method which can be used even for unknown objects, the domain-expanding technique in the present invention is the technique limited to those objects which can be modeled when represented by the sum of point scattering objects such as radar scattering object. Accordingly, a superior advantage as compared to the commonly used extrapolation method can be obtained for the purpose of improving antenna resolution. This is because its objects are limited and data are effectively acquired by using an analysis method suitable for the model thereof so as to expand the domain.

The reason for performing the low-pass filtering of the divided output signal before extracting exponential function components at the exponential function component extraction means in the present invention is as follows. In particular, since a band in spatial frequency exists physically in the signal derived from Fourier transform of the received electric field pattern of antenna, components in a region exceeding such band cannot be possessed. Frequency components of regions beyond the above described band, however, are contained in the divided signal (radio wave source distribution spectrum) which is acquired by performing signal processing at the division means. This occurs due to the difference between the actual processing and theoretical processing. If the signal components of the regions beyond such band are used as they are to perform processing at the next stage (extracting of exponential functions), a signal degradation results. Accordingly, the signal components of regions beyond the above described band are removed by thus performing low-pass filtering at such stage, so as to prevent degradation of signal.

DESCRIPTION OF THE PREFERRED EMBODIMENT

Figure 1:
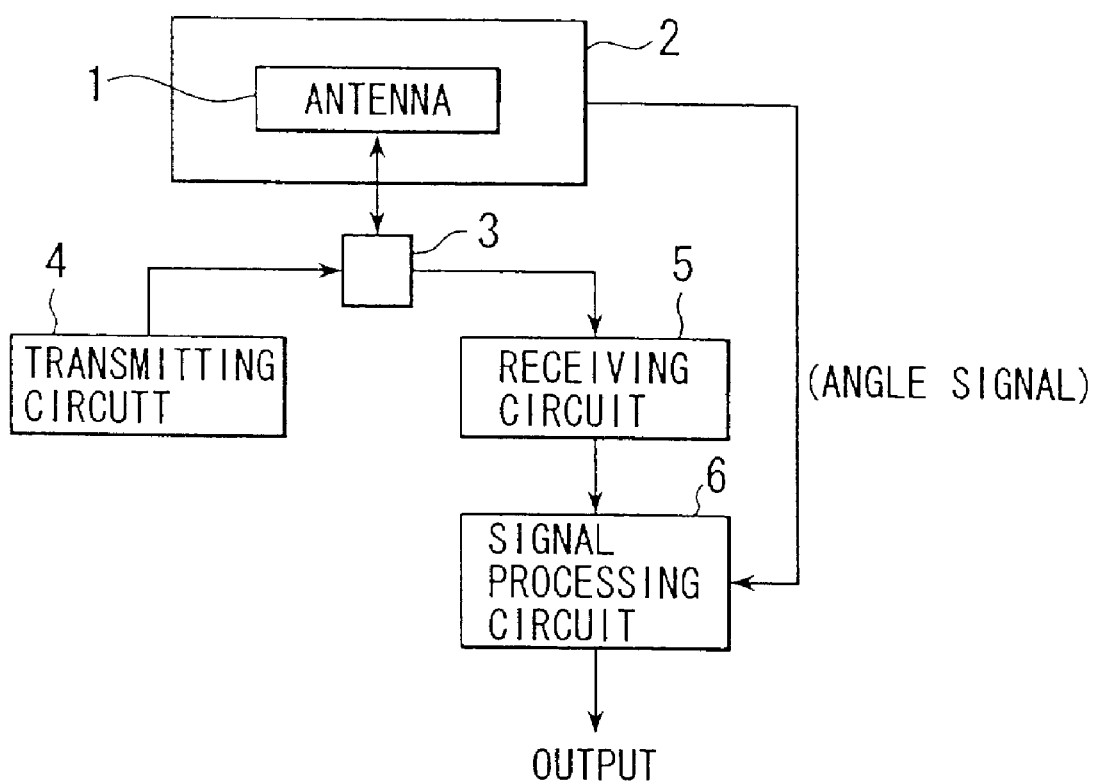
FIG. 1 is a block diagram showing an embodiment of the radio wave receiving apparatus according to the present invention.

An embodiment of the present invention will now be described. FIG. 1 is a schematic block diagram showing an embodiment where the radio wave receiving apparatus according to the present invention is applied to a radar apparatus. Referring to FIG. 1, what is denoted by numeral 1 is an antenna for transmitting and receiving radio waves, which may be of any type such as dipole antenna, horn antenna, parabola antenna, array antenna, etc. An antenna rotating device 2 rotates the antenna toward directions in which the antenna resolution is improved. A changeover switch 3 switches the connection between the antenna 1 and a transmitting circuit or a receiving circuit to be described below. Denoted by numeral 4 is a transmitting circuit, the transmitting power outputted from the transmitting circuit 4 being transmitted from the antenna 1 by way of the changeover switch 3. A receiving circuit 5 converts a radio wave received at the antenna 1 into an electric field signal.

Figure 2:
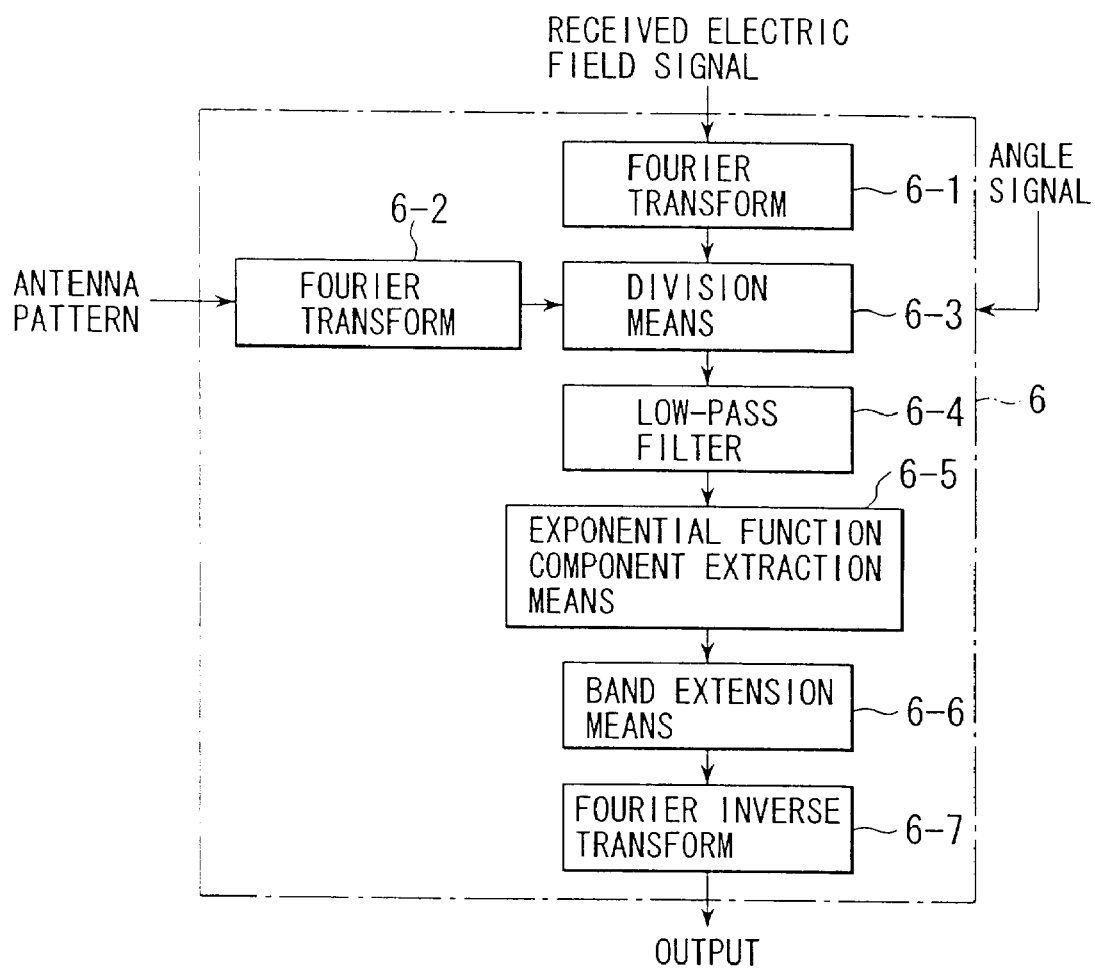
FIG. 2 is a block diagram showing an example of the signal processing circuit in the embodiment shown in FIG. 1.

Denoted by numeral 6 is a signal processing circuit, which as shown in FIG. 2 includes: a means 6-1 for accepting a signal of angle from the antenna rotating device 2 and effecting a Fourier transform in respect of azimuth of an electric filed signal outputted from the receiving circuit 5; a means 6-2 for effecting a Fourier transform in respect of azimuth of the antenna pattern related to radar of the antenna 1; a means 6-3 for dividing the electric field signal after the Fourier transform by the antenna pattern signal after the Fourier transform; a low-pass filter 6-4 for effecting low-pass filtering of the divided signal in respect of azimuthal frequency; a means 6-5 for extracting exponential function components of the signal passed through the low-pass filter 6-4; a means 6-6 for extending the band of the signal passed through the low-pass filter 6-4 beyond the cut-off frequency of the low-pass filter 6-4 by using the extracted exponential function components; and a means 6-7 for effecting a Fourier inverse transform of the band extended signal in respect of azimuth, the signal after the Fourier inverse transform being outputted as a final antenna output. It should be noted that one to which the Prony method for obtaining exponential function components from acquired data by using matrix operation is applied, for example, is used as the exponential function component extraction means 6-5.

A description will now be given with respect to the operation of a radar apparatus to which the radio wave receiving apparatus according to the present invention constructed as the above has been applied. A radio wave corresponding to the antenna pattern is transmitted from the antenna 1 while rotating the antenna 1. When the radio wave transmitted from the antenna 1 is returned as reflected by a scattering object, a received radio wave corresponding to the antenna pattern is outputted by the antenna 1. The received radio wave is converted into a receiving electric field signal at the receiving circuit 5 and then inputted to the signal processing circuit 6. In the signal processing circuit 6, a Fourier transform processing of the electric field signal is effected at the Fourier transform means 6-1 and it is then divided at the division means 6-3 by an antenna pattern signal which has been subjected to a Fourier transform at the Fourier transform means 6-2. It is then passed through the low-pass filter 6-4 and the exponential function components of the signal passed through the low-pass filter 6-4 are extracted at the exponential function component extraction means 6-5. The band of the signal passed through the low-pass filter 6-4 is then extended beyond the cut-off frequency of the low-pass filter 6-4 at the band extension means 6-6 by using the extracted exponential function components. The band-extended signal is then subjected to a Fourier inverse transform at the Fourier inverse transform means 6-7, the output thereof being outputted as a final output. A distribution function of scattering object (wave source) can thus be obtained at high accuracy in the above described manner.

Figure 3:
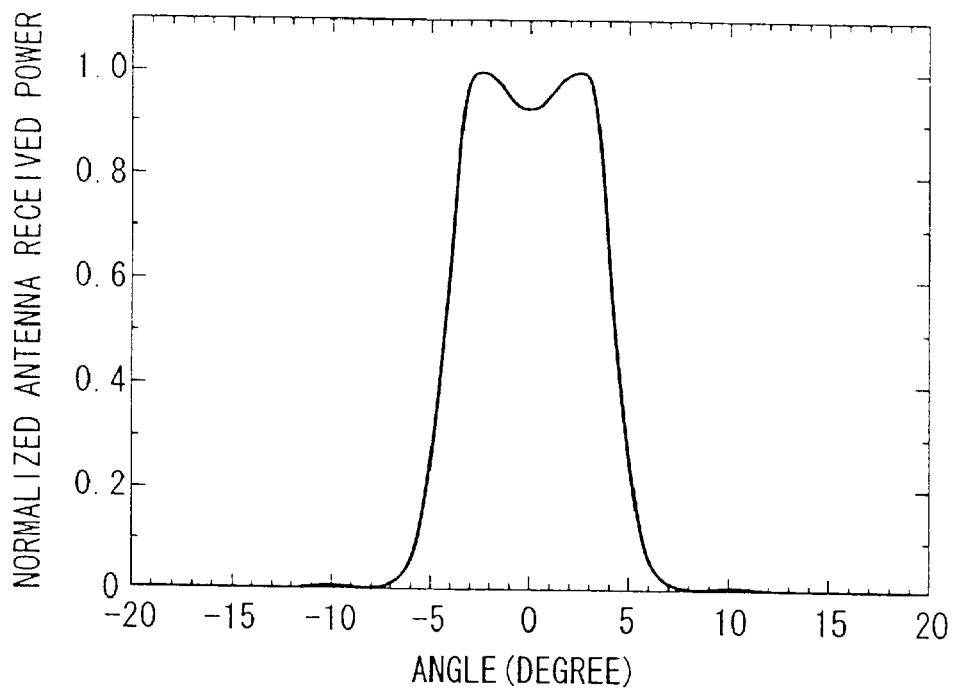
FIG. 3 shows the result of a simulation of antenna-received power response by an ordinary radar apparatus.
Figure 4:
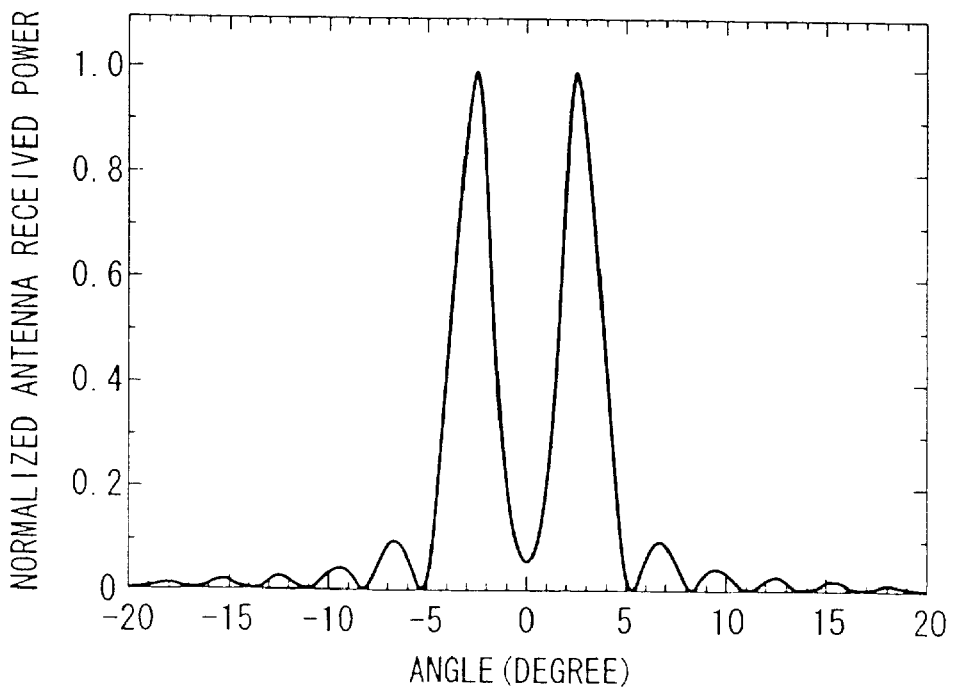
FIG. 4 shows the result of a simulation of antenna-received power response based on the signal processing, with the exclusion of the band extending processing, of the radio wave receiving apparatus according to the present invention.
Figure 5:
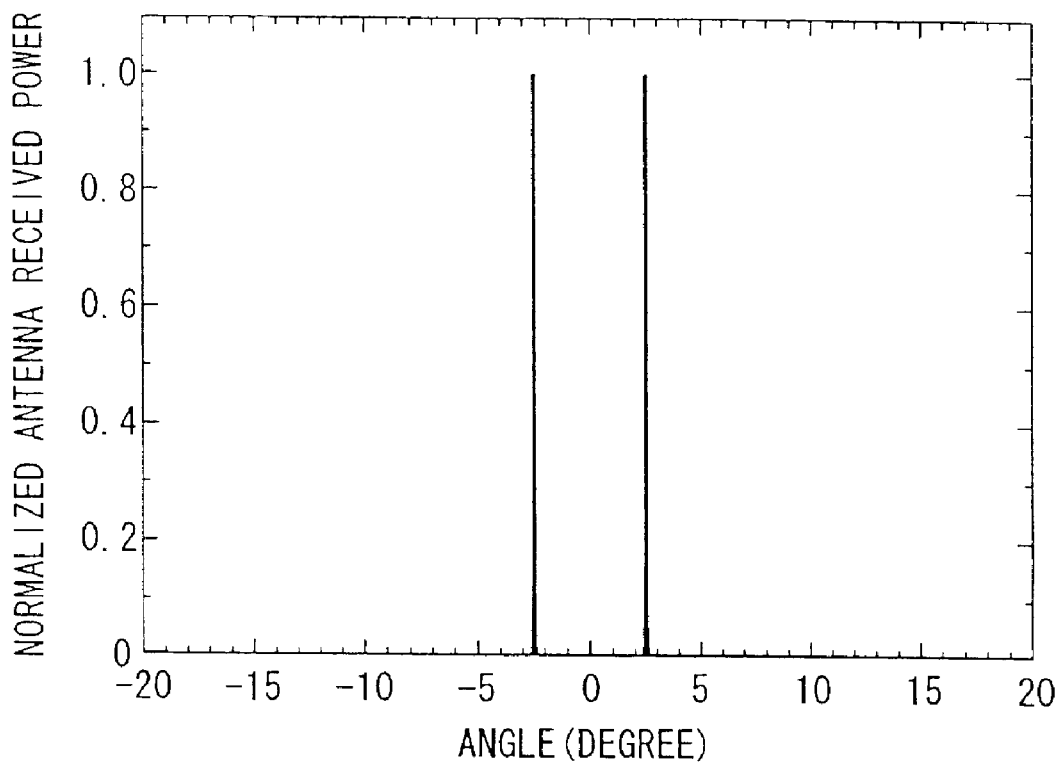
FIG. 5 shows the result of a simulation of antenna-received power response by the radio wave receiving apparatus according to the present invention.

FIGS. 3 to 5 each show a simulation result of the antenna receiving power pattern in the presence of two points of scattering object regarded as identical radio wave to each other and separated by 5 degree at an equidistance from the antenna, in the case where the antenna 1 is rotated by using as the antenna 1 an aperture antenna (antenna beamwidth: 5 degree) having a uniform distribution of the antenna length in rotating direction being 10.16 times the wavelength. FIG. 3 shows the antenna receiving power response of an ordinary radar apparatus without any processing of the received signal. FIG. 4 shows the antenna receiving power response in the case where the signal processing for improving the resolution according to the present invention is effected with the exclusion of the band extending processing based on exponential function components. FIG. 5 shows the antenna receiving power response in the case of effecting the signal processing including the band extending processing based on exponential function components for improving the resolution according to the present invention. It should be noted that, in FIGS. 3 to 5, the power value normalized by the maximum value of respective antenna receiving power response is shown in relation to angle.

As can be seen from these figures, while it is difficult to determine as the presence of two scattering objects from the response in the ordinary radar apparatus, it is possible to infer the presence of scattering objects approximately at −2.5 degree and at +2.5 degree from the response that results when the signal processing for improving the antenna resolution according to the present invention is effected with the exclusion of the band extending processing. Effecting of the signal processing including the band extending processing based on exponential function components for improving the resolution according to the present invention, however, results in a response from which it is clearly determined as the presence of scattering objects approximately at −2.5 degree and at +2.5 degree. In other words, a further improvement in the antenna resolution is seen.

While the above embodiment has been described as one using a mechanical antenna rotating device as the means for moving the pointing direction of the antenna beam toward directions for improving resolution, those which can be used as the means for moving the pointing direction of the antenna beam include: an electronic antenna beam scanning means; a means mounted on a traveling body such as aircraft, for moving the antenna beam by moving the position of the antenna; etc.

Further, while, in the above embodiment, the present invention has been applied to a radar apparatus, the invention can be applied to any apparatus, such as radio wave sensor, for receiving and processing radio waves.

As has been described by way of the above embodiment, in accordance with the present invention, a Fourier transform signal in respect of azimuth of an electric field received at the antenna is divided by a Fourier transform signal in respect of azimuth of the antenna pattern. The divided signal is passed through a low-pass filter in respect of azimuthal frequency and the exponential function components are extracted of the passed signal. The band of the output signal of the low-pass filter is extended on the basis of such exponential function components and the extended signal is subjected to a Fourier inverse transform in respect of azimuth, the signal resulting from the inverse transform being outputted as a final output signal. It is thus possible to directly obtain a wave source distribution function at high accuracy and hence to further improve the antenna resolution.

What is claimed is:

1. A radio wave receiving apparatus having an antenna for receiving radio waves and means for moving the pointing direction of an antenna beam of the antenna toward directions for improving resolution, said radio wave receiving apparatus comprising:

means for effecting a Fourier transform in respect of azimuth of a received electric field signal obtained from the antenna while moving said antenna beam;

means for effecting a Fourier transform in respect of azimuth of a received electric field pattern in the presence of one point source of wave of the antenna;

means for dividing a signal resulting from the Fourier transform in respect of azimuth of said antenna received electric field signal by a signal resulting from the Fourier transform in respect of azimuth of said received electric field pattern in the presence of one point source of wave of the antenna; and a low-pass filter for subjecting the signal divided at the division means to a low-pass filtering in respect of azimuthal frequency;

means for extracting exponential function components of the output signal of the low-pass filter;

band extension means for extending said output signal of the low-pass filter into an azimuthal frequency region beyond the cut-off frequency of the low-pass filter by using the extracted exponential function components; and means for subjecting the signal extended by the band extension means to a Fourier inverse transform in respect of azimuth, the signal after said Fourier inverse transform being outputted as a final antenna output.

2. The radio wave receiving apparatus according to claim 1, wherein said means for moving the pointing direction of an antenna beam comprises an antenna rotating device.

3. The radio wave receiving apparatus according to claim 1, wherein said means for moving the pointing direction of an antenna beam comprises an electronic antenna beam scanning device.

4. The radio wave receiving apparatus according to claim 1, wherein said means for moving the pointing direction of an antenna beam comprises an antenna moving device.

* * * * *